March 31, 1931.   N. PEDERSON ET AL   1,798,351
POWER ATTACHMENT FOR CORN PICKERS
Filed Nov. 8, 1929

INVENTORS:
Nels Pederson
Edwin Grindberg
BY David E. Carlsen
ATTORNEY.

Patented Mar. 31, 1931

1,798,351

UNITED STATES PATENT OFFICE

NELS PEDERSON AND EDWIN GRINDBERG, OF TRENT, SOUTH DAKOTA

POWER ATTACHMENT FOR CORN PICKERS

Application filed November 8, 1929. Serial No. 405,629.

Our invention relates to an improved traction or power device detachably connected with corn binders and like implements. The main object is to provide a simple, efficient and inexpensive device embodying a wheel supported frame on which is mounted a motor and connected traction and power means all built as a unit and readily attached to a corn-harvester frame as hereinafter fully set forth and as illustrated in the accompanying drawing, in which,—

Figure 1:
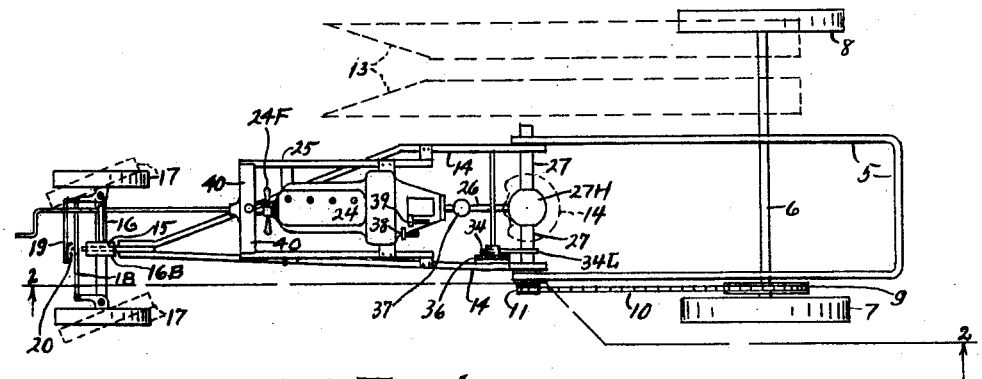
Fig. 1 is a plan view of our power attachment operatively connected with the frame of a corn-harvester or so-called corn-picker.

Referring to the drawing by reference numerals, we have illustrated only a limited number of parts of a corn-harvester or so-called corn picker of the usual horse-drawn type, said parts including an elongated, forwardly opening and usually inclined frame 5 of U-shape and supported on an axle 6 and the bull wheel 7 and auxiliary wheel 8. 9 is a chain-sprocket connected to the bull wheel 7 and engaged by a main drive chain 10. In standard pickers this chain conveys power to various operating means of the picker (not shown). This chain may be used with our device for the said purposes or auxiliary chains may be used as needed.

In our device the chain 10 is run from sprocket 9 forward and engaging a drive sprocket 11 on a transverse drive shaft 12 rotatably mounted in the rear part of our power attachment.

Figure 2:
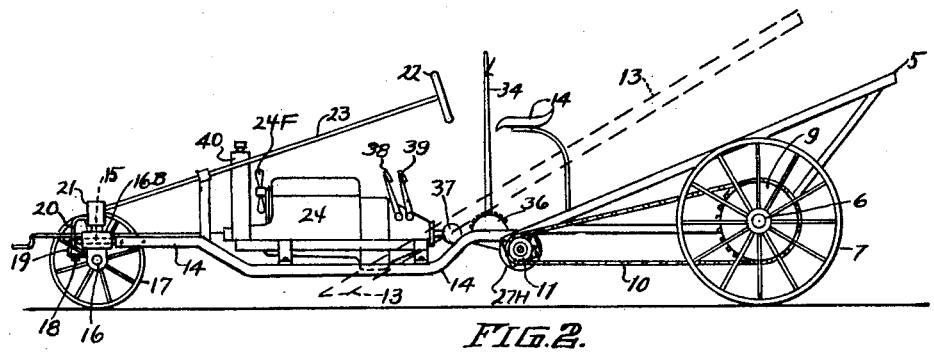
Fig. 2 is a partly sectional longitudinal or side elevation about as on line 2—2 in Fig. 1 with certain additional details.
Figure 4:
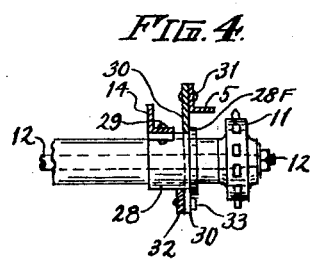
Fig. 4 is a fragmentary view of the joint shown in Fig. 3 about as on line 4—4 in said latter figure.
Figure 3:
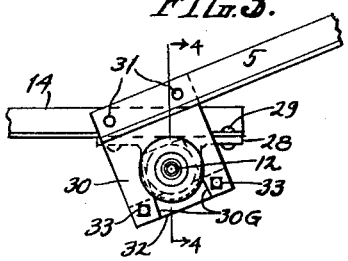
Fig. 3 is an enlarged, side, detail elevation of one of the pivotal connection means of our device with the picker frame.

13 in Figs. 1 and 2 in dotted outline, illustrates the so-called dividers of a corn picker in approximately correct position relative to frame 5, said dividers inclined forward and downwardly and pointed as usual to gather the corn stalks between the divider members as the machine moves forward. 44 is the driver's seat fixed over the front part of the frame 5.

The dividers 13 are mounted in fixed relation to frame 5 and means provided on such machines are used to raise or lower same so that the points of the dividers 13 are at suitable height for cutting the corn.

For the purpose of more clear understanding of our device it will be stated that in some instances a draft pole rigidly connected to frame 5 is used, and in other cases a pole truck connected to frame 5 and having its wheel support forward thereof is used. Our device includes a truck frame pivotally connected to the front part of frame 5 extending forwardly therefrom and its front end supported by a two-wheel truck with suitable steering gear. Said truck frame is of V-shape and designated 14, closed at its front end where it is formed with a support pin 15 normally in a central bearing 16B of a two wheel truck axle 16 of which 17 are the wheels connected by a steering reach rod 18 manipulated by a link-rod 19. Said latter rod is connected also to a lever 20 suitably journaled in a steering gear housing 21 fixed over the axle and turned by the steering wheel 22 and its column 23 (see Fig. 2), said steering wheel 22 being normally in front of the driver's seat 44 about as shown.

24 is a motor, shown as a four cylinder gasoline engine of the Ford type mounted on an elongated frame 25 suitably mounted on our V-frame 14 intermediate its ends, said frame being offset downwardly as shown in Fig. 2 to provide for the motor being set at a low level so its drive shaft 26 may be properly alined and extended to a differential housing 27H of the transverse drive-axle housing 27 on the outer end parts of which are fixed two bearings 28 fixed as at 29 to the spaced rear ends of the frame 14. This drive-axle may be a standard rear auto-axle from the end of which the ground wheels have been removed and a chain drive pinion 11 substituted. The outer extremity of each bearing 28 may have a perimetral flange 28F and between this flange and the fastening means the bearing is round and straddled by a downwardly directed connection plate 30 fixed at 31 to the front ends of frame 5, the lower part of said plate being bifurcated to provide a downward opening gap 30G to straddle bearing 28 as described and extend below it said lower parts may be connected by a bar 32 or other suitable closing means fixed as at 33 and engaging the underside of the bearing 28. Thus a pivotal, removable connection is provided for the frames 5 and 14 and the tractor device is readily removable from the corn-picker, as a separate unit.

Various means may be employed for holding the said joined parts at variable elevations. We have shown only a hand lever 34 pivoted on a cross shaft 35 mounted in frame 14 forward of the drive axle 27 and having a lever arm 34L engaging the top of said axle 27. The lever 34 may be manipulated and locked to a fixed ratchet 36 raising or lowering shaft 35 with relation to axle 27 and changing the fixed angle between frames 5 and 14 and raising level of the drive axle as desired, the consequent change of angle of frame 5 desired determining the working level of the front ends of the divider frame 13.

It will be readily understood that our device comprises a V-shaped auxiliary frame detachably connected pivotally to the front part of the picker frame extending forwardly therefrom and in alinement therewith, its front end supported by a steering wheel truck. Said pivot means comprises in part an automobile type rear axle fixed to the rear part of said V-frame and the power means an auto engine mounted on the V-frame and connected to the drive axle through the universal joint 37 and drive shaft 26 to rotate the drive sprocket 11 connected by chain 10 to rotate the picker axle 6 and ground wheel 7. 38—39 are respectively the clutch and brake foot pedals of the engine 24 in a position such as to be readily operable by a driver seated at 44.

Only one drive pinion 11 is shown but it is obvious one may be fixed at each end of drive-axle 12 to have operative connection with the axle 6, said latter axle having further means (not shown) for operating various parts of the picker. 40 is a radiator of auto-type mounted on the engine frame 25 forward of the engine and its usual fan 24F.

We claim:

1. A power attachment for corn harvesters having an elongated U-shaped forwardly opening wheel supported frame member normally in forward and downwardly inclined plane and adapted to carry corn harvesting means adjacent said frame; said attachment comprising an engine supporting main frame of approximately V-shape detachably and adjustably connected with its wider end between said spaced front ends of the U-frame, a truck member pivotally supporting the front and smaller end of said V-frame and steering means for the wheels of said truck, said pivot connection means comprising a transverse fixed axle housing on the rear of said V-frame and a rotatable drive shaft mounted therein and extending outwardly of said axle-housing, drive pinion means on said drive shaft and means for connecting same to the axle of the supporting wheels of the corn picker, an engine mounted on said V-frame, and controlled means on said engine for rotating the said drive axle and said latter means of the engine in accessible position to a driver.

2. The structure specified in claim 1, in which said pivotal connection between the picker frame and the V-shaped frame comprise further, on the former, a downwardly directed bifurcated plate at each of its forward ends, a bearing member fixed one near each end of said drive axle-housing of the V-frame and fixed also to the rear part of each one of said rear arm parts of the V-frame, said bifurcated plate parts of the U-frame adapted to downwardly straddle said fixed bearings and extend therebelow and removable means for connecting said lower parts of each said plate and engage the under side of the respective bearings.

3. The structure specified in claim 1, in which said pivotal connection between the picker frame and the V-shaped frame comprise further, on the former, a downwardly directed bifurcated plate at each of its forward ends, a bearing member fixed one near each end of said drive axle-housing of the V-frame and fixed also to the rear part of each one of said rear arm parts of the V-frame, said bifurcated plate parts of the U-frame adapted to downwardly straddle said fixed bearings and extend therebelow and removable means for connecting said lower parts of each said plate and engage the under side of the respective bearings, and means mounted on the rear part of said V-frame in proximity to its drive-axle housing for selectively raising or lowering said pivotal frame connections to predetermined levels for the purpose set forth.

In testimony whereof we affix our signatures.

NELS PEDERSON.
EDWIN GRINDBERG.